United States Patent
Chen et al.

(10) Patent No.: US 11,650,970 B2
(45) Date of Patent: May 16, 2023

(54) EXTRACTING STRUCTURE AND SEMANTICS FROM TABULAR DATA

(71) Applicant: International Business Machines Corporation, Armonk, NY (US)

(72) Inventors: Xilun Chen, Ithaca, NY (US); Laura Chiticariu, San Jose, CA (US); Alexandre Evfimievski, San Jose, CA (US); Marina Danilevsky Hailpern, San Jose, CA (US); Prithviraj Sen, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1469 days.

(21) Appl. No.: 15/916,535

(22) Filed: Mar. 9, 2018

(65) Prior Publication Data
US 2019/0278853 A1    Sep. 12, 2019

(51) Int. Cl.
G06F 16/22   (2019.01)
G06F 16/25   (2019.01)
G06F 16/901  (2019.01)

(52) U.S. Cl.
CPC .......... *G06F 16/2282* (2019.01); *G06F 16/25* (2019.01); *G06F 16/9024* (2019.01)

(58) Field of Classification Search
None
See application file for complete search history.

(56) References Cited

U.S. PATENT DOCUMENTS

| | | |
|---|---|---|
| 4,504,969 A | 3/1985 | Suzuki |
| 5,420,695 A | 5/1995 | Ohta |
| 5,485,566 A | 1/1996 | Rahgozar |
| 5,668,892 A | 9/1997 | Itonori |
| 5,708,730 A | 1/1998 | Itonori |
| 5,737,442 A | 4/1998 | Alam |
| 6,006,240 A | 12/1999 | Handley |
| 6,173,073 B1 | 1/2001 | Wang |
| 6,711,292 B2 | 3/2004 | Wang |

(Continued)

OTHER PUBLICATIONS

IBM: List of IBM Patents or Patent Applications Treated as Related, Aug. 30, 2021, pp. 1-2.

(Continued)

*Primary Examiner* — Kim T Nguyen
(74) *Attorney, Agent, or Firm* — Ryan, Mason & Lewis, LLP (57) ABSTRACT

Methods, systems, and computer program products for extracting structure and semantics from tabular data are provided herein. A computer-implemented method includes processing tabular data comprising data cells and header cells, wherein the processing includes: identifying one or more regions within the tabular data, wherein each of the regions comprises one or more of the data cells; matching some of the regions to one or more of the header cells, wherein the matched header cells are semantically related to the data cells inside the matched region; and generating, based on the matching, an output describing semantic relationships between the data cells and the header cells. The method also includes creating, for each data cell, a tuple comprising semantic information contained within one or more of the header cells that pertains to the data cell.

19 Claims, 7 Drawing Sheets

(56) References Cited

U.S. PATENT DOCUMENTS

| | | | |
|---|---|---|---|
| 6,757,870 | B1 | 6/2004 | Stinger |
| 7,602,972 | B1 | 10/2009 | Wei |
| 7,707,488 | B2 | 4/2010 | Gurcan et al. |
| 7,953,682 | B2 | 5/2011 | Smith et al. |
| 8,121,412 | B2 | 2/2012 | Predovic |
| 8,176,414 | B1 | 5/2012 | Baluja |
| 8,412,757 | B2 | 4/2013 | Das Gupta |
| 8,443,278 | B2 | 5/2013 | Mansfield et al. |
| 8,718,364 | B2 | 5/2014 | Enomoto |
| 8,818,100 | B2 | 8/2014 | Bastos Dos Santos |
| 8,914,419 | B2 | 12/2014 | Gerard et al. |
| 9,235,756 | B2 | 1/2016 | Ma |
| 9,268,999 | B2 | 2/2016 | Xu |
| 9,348,848 | B2 | 5/2016 | Dong |
| 9,367,766 | B2 | 6/2016 | Wang et al. |
| 9,569,417 | B2 | 2/2017 | Byron et al. |
| 9,569,418 | B2 * | 2/2017 | Hirzel ............... G06F 40/18 |
| 9,697,423 | B1 | 7/2017 | Bellert |
| 9,727,532 | B2 | 8/2017 | Perronnin et al. |
| 9,818,313 | B2 * | 11/2017 | Damery ............... G10L 13/00 |
| 9,898,523 | B2 | 2/2018 | Cox |
| 9,990,347 | B2 | 6/2018 | Raskovic et al. |
| 10,120,852 | B2 * | 11/2018 | Goto ............... G06F 40/177 |
| 10,176,160 | B2 * | 1/2019 | Hirzel ............... G06F 40/106 |
| 10,242,257 | B2 | 3/2019 | Hosebettu |
| 10,339,212 | B2 | 7/2019 | Agrawal |
| 10,599,924 | B2 | 3/2020 | Yang et al. |
| 11,200,413 | B2 * | 12/2021 | Burdick ............... G06F 40/177 |
| 2003/0097384 | A1 | 5/2003 | Hu |
| 2004/0093355 | A1 | 5/2004 | Stinger |
| 2005/0210371 | A1 | 9/2005 | Pollock |
| 2007/0092140 | A1 | 4/2007 | Handley |
| 2007/0186152 | A1 | 8/2007 | Gurcan |
| 2008/0040655 | A1 | 2/2008 | Tanaka |
| 2008/0291122 | A1 | 11/2008 | Smith et al. |
| 2009/0271433 | A1 | 10/2009 | Perronnin et al. |
| 2009/0304282 | A1 | 12/2009 | Predovic |
| 2010/0299379 | A1 | 11/2010 | Das Gupta |
| 2011/0164813 | A1 | 7/2011 | Enomoto |
| 2012/0121182 | A1 | 5/2012 | Predovic |
| 2013/0191715 | A1 | 7/2013 | Raskovic |
| 2013/0290376 | A1 | 10/2013 | Dong et al. |
| 2015/0026178 | A1 | 1/2015 | Byron et al. |
| 2015/0378979 | A1 * | 12/2015 | Hirzel ............... G06F 40/18 715/220 |
| 2016/0026899 | A1 | 1/2016 | Wang et al. |
| 2016/0104077 | A1 | 4/2016 | Jackson, Jr. |
| 2017/0017683 | A1 * | 1/2017 | Fourny ............... G06F 16/22 |
| 2017/0046327 | A1 * | 2/2017 | Goto ............... G06F 40/18 |
| 2017/0097925 | A1 * | 4/2017 | Hirzel ............... G06F 40/106 |
| 2017/0193202 | A1 | 7/2017 | Peller |
| 2017/0193292 | A1 | 7/2017 | Peller |
| 2019/0026550 | A1 | 1/2019 | Yang et al. |
| 2019/0050381 | A1 | 2/2019 | Agrawal |
| 2019/0266394 | A1 | 8/2019 | Yu |
| 2019/0278837 | A1 | 9/2019 | Agrawal |
| 2019/0278853 | A1 * | 9/2019 | Chen ............... G06F 16/211 |
| 2019/0340240 | A1 | 11/2019 | Duta |
| 2020/0167558 | A1 | 5/2020 | Yang et al. |
| 2020/0175267 | A1 | 6/2020 | Schafer et al. |

OTHER PUBLICATIONS

He, Dafang et al. "Multi-scale Multi-task FCN for Semantic Page Segmentation and Table Detection", 2017 IEEE. <https://doi.org/10.1109/ICDAR.2017.50> (Year: 2017).

Pasupat et al., "Compositional Semantic Parsing on Semi-Structured Tables," 2015. http://nlp.stanford.edu/software/sempre/wikitable/.

IP.Com, IPCOM000245463D, Automatic Transformation of Unstructured and Semi-structured Document Tables to Structured Relational Database Format, Mar. 11, 2016.

Cruz et al., Semantic Extraction of Geographic Data from Web Tables for Big Data Integration, 2013.

Chen et al., "Automatic web spreadsheet data extraction," in Proceedings of the 3rd International Workshop on Semantic Search over the Web, 2013.

Barowy et al., "Flashrelate: extracting relational data from semi-structured spreadsheets using examples," in ACM SIGPLAN Notices, 2015.

Chen et al., "Integrating spreadsheet data via accurate and low-effort extraction," in Proceedings of the 20th ACM SIGKDD international conference on Knowledge discovery and data mining, 2014.

Chiticariu et al., "Transparent machine learning for information extraction," in EMNLP (Tutorial), 2015.

Gobel et al., "A methodology for evaluating algorithms for table understanding in pdf documents," in Proceedings of the 2012 ACM symposium on Document engineering, 2012.

Yidiz et al., "pdf2table: A method to extract table information from PDF files," in Proceedings of the 2nd Indian International Conference on Artificial Intelligence, 2005.

Cohen, W., "Fast effective rule induction," in In Proceedings of the 12th International Conference on Machine Learning, 1995.

Rastan et al., "Texus: A task-based approach for table extraction and understanding," in Proceedings of the 2015 ACM Symposium on Document Engineering, 2015.

Chen et al., "Senbazuru: A prototype spreadsheet database management system," Proceedings of the VLDB Endowment, 2013.

Adelfio et al., "Schema extraction for tabular data on the web," Proc. VLDB Endow., 2013.

Jauhar et al., "Tables as semi-structured knowledge for question answering," in Proceedings of the 54th Annual Meeting of the Association for Computational Linguistics, 2016.

Pasupat et al., "Inferring logical forms from denotations," in Proceedings of the 54th Annual Meeting of the Association tor Computational Linguistics, 2016, pp. 23-32.

Yin et al., "Neural enquirer: Learning to query tables with natural language," arXiv preprint arXiv:1512.00965, 2015.

Liu et al., "Identifying table boundaries in digital documents via sparse line detection," in Proceedings of the 17th ACM conference on Information and knowledge management, 2008.

Liu et al., "Improving the table boundary detection in pdfs by fixing the sequence error of the sparse lines," in 10th International Conference on Document Analysis and Recognition, 2009.

Seth et al., "Segmenting tables via indexing of value cells by table headers," in Proceedings of the 2013 12th International Conference on Document Analysis and Recognition, 2013.

Zanibbi et al., "A survey of table recognition: Models, observations, transformations, and inferences," International Journal of Document Analysis and Recognition (IJDAR), 2004.

Embley et al., "Table-processing paradigms: A research survey," International Journal of Document Analysis and Recognition (IJDAR), 2006.

Couasnon et al., "Recognition of tables and forms," in Handbook of Document Image Processing and Recognition, 2014.

Liu, Y., "Tableseer: automatic table extraction, search, and understanding," Ph.D. dissertation, The Pennsylvania State University, 2009.

Fang et al., "Table header detection and classification," in Proceedings of the 26th AAAI Conference on Artificial Intelligence, 2012.

Perez-Arriaga et al., TAO: System for Table Detection and Extraction from PDF Documents, Proceedings of the Twenty-Ninth International Florida Artificial Intelligence Research Society Conference, 2016.

Fang et al., A Table Detection Method for Multipage PDF Documents via Visual Seperators and Tabular Structures, 2011 International Conference on Document Analysis and Recognition.

Chandran et al., Structural Recognition of Tabulated Data. Proc. 2nd Intl. Conf. on Document Analysis and Recognitior (ICDAR), Tsukuba, Japan, Oct. 20-22, 1993, pp. 516-519.

Itonori, K., Table Structure Recognition Based on Textblock Arrangement and Ruled Line Position. Proc. 2nd Intl. Conf. on Document Analysis and Recognition (ICDAR), Tsukuba, Japan, Oct. 20-22, 1993, pp. 765-768.

Kieninger, The T-Recs Table Recognition and Analysis System. Springer, Document Analysis Systems: Theory and Practice, LNCS vol. 1655, 1999, pp. 255-270.

(56) References Cited

OTHER PUBLICATIONS

Handley, J., Table Analysis for Multi-line Cell Identification. Proc. SPIE, the International Society for Optical Engineering, vol. 4307, Document Recognition and Retrieval VIII, Dec. 2000, pp. 34-43.

Kieninger et al., The T-Recs Approach for Table Structure Recognition and Table Border Determination. Proc. 6th Intl Conf. on Document Analysis and Recognition (ICDAR), Seattle WA, USA, Sep. 10-13, 2001, pp. 518-522.

Pinto et al., Table Extraction Using Conditional Random Fields. Proceedings of the 26th Annual International ACM SIGIR Conference on Research and Development in Informaion Retrieval (SIGIR '03), Toronto, Canada, Jul. 28-Aug. 1, 2003, pp. 235-242.

Wang et al., Table Structure Understanding and Its Performance Evaluation. Pattern Recognition, vol. 37, No. 7, Jul. 2004, pp. 1479-1497.

Mandal et al., A Simple and Effective Table Detection System from Document Images. International Journal of Document Analysis and Recognition (IJDAR), vol. 8, No. 2-3, Jun. 2006, pp. 172-182.

Hassan et al., Table Recognition and Understanding from PDF Files. Proc. 9th Intl. Conf. on Document Analysis and Recognition (ICDAR), Parana, Brazil, Sep. 23-26, 2007, vol. 2, pp. 1143-1147.

Oro et al., PDF-TREX: An Approach for Recognizing and Extracting Tables from PDF Documents. Proc. 10th Intl. Conf. on Document Analysis and Recognition (ICDAR), Barcelona, Spain, Jul. 26-29, 2009, pp. 906-910.

Shafait et al., Table Detection in Heterogeneous Documents. Proc. 9th IAPR Intl. Workshop on Document Analysis Systems (DAS), Boston, MA, USA, Jun. 9-11, 2010, pp. 65-72.

Deckert et al., Table Content Understanding in smartFIX. Proc. 11th Intl. Conf. on Document Analysis and Recognition (ICDAR), Beijing, China, Sep. 18-21, 2011, pp. 488-492.

Chen et al., Model-Based Tabular Structure Detection and Recognition in Noisy Handwritten Documents. Proc. 2012 Intl. Conf. on Frontiers in Handwriting Recognition (ICFHR), Bari, Italy, Sep. 18-20, 2012, pp. 75-80.

Ghanmi et al., Table Detection in Handwritten Chemistry Documents Using Conditional Random Fields. Proc. 14th Intl. Conf. on Frontiers in Handwriting Recognition (ICFHR), Crete, Greece, Sep. 2014, pp. 146-151.

Lee et al., Algorithms for Non-negative Matrix Factorization. Proceedings of the 13th International Conference on Neural Information Processing Systems (NIPS), pp. 535-541, 2000.

Wikipedia, Apache SystemML, https://en.wikipedia.org/w/index.php?title=Apache_SystemML&oldid=789525799, Jul. 7, 2017.

\* cited by examiner

| Single-row Features (local) | | Rectangle Features (global) | |
|---|---|---|---|
| Feature Name | Order | Feature Name | Order |
| Boldness | T ≻ F | isEndedSection | T ≺ F |
| Indentation | G ≺ L | isEmptySection | T ≻ F |
| Blankness | T ≺ F | | |
| Capitalization | T ≻ F | | |
| isSectionHeader | T ≻ F | | |
| isTotalRow | See text | | |

Input: List of rows $C$ starting from the top; Partially ordered set $(\Phi, \preceq)$
Output: Set of parent-child relations $P$
State: Maintains *ordered list* $R$ of active top-level rectangles 1: $P = \emptyset$
2: $R = C$ ▷ Initially each row is a rectangle
3: repeat
4:    $combineR$ = new $List()$ ▷ Init with empty list
5:    $M$ = findMinimalRects($R, \Phi$)
6:    ▷ Combination Stage
7:    for all $r_i \in R$ do ▷ $r_i$ is the *i*-th rectangle in $R$
8:      if $r_i \in M$ and $r_i \asymp r_{i+1} \asymp \cdots \asymp r_j$ then
9:        $combineR$.append(Combine($r_i, \ldots, r_j$))
10:     else $combineR$.append($r_i$)
11:   $attachR$ = new $List()$
12:   $M$ = findMinimalRects($combineR, \Phi$)
13:   ▷ Attaching Stage
14:   for all $r_i \in combineR$ do
15:     if $r_{i+1} \in M$ and $r_i \succ r_{i+1}$ then
16:       $attachR$.append(Attach($r_i, r_{i+1}$))
17:       $P = P \cup$ addRelations($r_i, r_{i+1}$)
18:     else $attachR$.append($r_i$)
19:   $R = attachR$
20: until $R$ not changing
21: return $P$

EXTRACTING STRUCTURE AND SEMANTICS FROM TABULAR DATA

FIELD

The present application generally relates to information technology, and, more particularly, to tabular data analysis.

BACKGROUND

Financial reports, as an example of tabular data, provide information on enterprise activity and can be crucial in applications such as investment, regulatory compliance, and market research. Commonly, such reports employ financial tables to report a comprehensive set of information at a given level of granularity. The current information age has resulted in a rapidly increasing demand for automatically understanding such tables.

However, financial tables are typically designed for human consumption by domain experts. While guidelines exist for reporting financial content, there are generally no presentation standards such as markup or visual cues (such as indentation, font style, etc.) to communicate information relationships, making financial tables difficult to comprehend in an automated fashion. Further, many financial tables employ complex semantic structures (sometimes referred to as disaggregation) to present denser information, adding more challenges to automatic comprehension.

SUMMARY

In one embodiment of the present invention, techniques for extracting structure and semantics from tabular data are provided. An exemplary computer-implemented method can include processing a given set of tabular data comprising multiple data cells and multiple header cells, wherein the processing includes: identifying one or more regions within the given set of tabular data, wherein each of the one or more regions comprises one or more of the data cells; matching at least one of the one or more identified regions to one or more of the header cells, wherein each of the one or more matched header cells is semantically related to (i) all of the data cells inside the respective matched region, and (ii) none of the data cells outside of the respective matched region; and generating, based on said matching, an output describing one or more semantic relationships between at least a subset of the data cells and at least a subset of the header cells. The method also includes creating, for each of the multiple data cells within the given set of tabular data, and based on said processing, a tuple comprising semantic information that (i) is contained within one or more of the header cells and (ii) pertains to the data cell.

In another embodiment of the invention, an exemplary computer-implemented method can also include processing a given set of tabular data comprising one or more data cells and one or more header cells, mapping each of one or more rectangular regions within the given set of tabular data to a vector of one or more features, and generating a partial ordering of the one or more rectangular regions based on the vector to which each of the one or more rectangular regions is mapped. Such a method can also include identifying, based on the generated partial ordering, at least one of the one or more rectangular regions, wherein each of the at least one identified rectangular regions comprises at least one of the one or more data cells that are semantically related to at least one of the one or more header cells. Further, such a method can include creating, for each of the one or more data cells, and based on the at least one identified rectangular region, a tuple comprising semantic information that (i) is contained within the one or more header cells and (ii) pertains to the data cell, and outputting the created tuples to at least one user.

In yet another embodiment of the invention, an exemplary computer-implemented method can include identifying multiple semantically-related rectangular regions in a table, the table having header cells and data cells therein, wherein one or more of the identified semantically-related rectangular regions overlap each other within the table, and wherein each of the identified semantically-related rectangular regions include all of the data cells semantically-related to at least one of the header cells; for each of the data cells within the identified semantically-related rectangular regions, creating a tuple that includes semantic information (i) pertaining to the data cell and (ii) that appears in the table; and outputting the created tuples to at least one user.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

In contrast to conventional approaches, the techniques detailed herein include mapping tabular data into database records (referred to herein as tuples), one tuple per data cell, wherein each tuple contains information from all header cells semantically relevant to the data cell associated with that tuple.

These and other objects, features and advantages of the present invention will become apparent from the following detailed description of illustrative embodiments thereof, which is to be read in connection with the accompanying drawings.

DETAILED DESCRIPTION

As described herein, an embodiment of the present invention includes extracting structure and semantics from tabular data. As detailed herein, financial statements report information in tables with complex semantic structure, which can be challenging to interpret automatically. For example, in such tables, a row of data cells is often explained by the headers of other rows. At least one embodiment of the invention includes providing and implementing a rectangle mining framework for comprehending (complex) tabular data, and which considers rectangular regions rather than individual cells or pairs of cells in a table. One or more embodiments of the invention include instantiating such a framework with an algorithm (also referred to herein as REMINE) for extracting row header semantics of a table.

Accordingly, at least one embodiment of the invention can include extracting hierarchical relationships in table headers, in which at least one entry in a column (or row) in the table has corresponding descriptive information in more than one row (or column) in the table. Such an embodiment includes identifying characteristics of at least some of the entries in the table (such as font size, indentation, font style, etc.), and using the identified characteristics in conjunction with the REMINE algorithm described herein to extract the hierarchy from the table. As also further detailed herein, in at least one embodiment of the invention, the REMINE algorithm identifies one or more candidate rectangular regions, and then, for a sub-set of the candidate rectangular regions, identifies header cells, such that each region exactly circumscribes all data cells semantically related to the specified header cell or cells. In other words, the region is the support rectangle of its matched header cell(s). As used herein, a support rectangle for a given cell refers to a contiguous rectangular region formed by all of the cells semantically headed (that is, explained) by the given cell. Also, in such an embodiment, the matched header cell(s) may be inside the corresponding support rectangle, or may be outside the corresponding support rectangle (above the support rectangle, for example).

As detailed herein, one or more embodiments of the invention can include table semantics extraction. Given a data cell in a table, such an embodiment can include identifying all other semantically relevant cells (that is, the cells that explain the meaning of the given data cell), and forming a semantic tuple. In tables having a simple structure, table semantics extraction can include finding the row header cells and the column header cells that co-align with the given data cell. In one or more embodiments of the invention, table semantics extraction can include identifying the non-co-aligned semantically relevant cells as well.

Web spreadsheets can show that many tables exhibit a data-frame structure that includes a subset of four regions: table headers, row headers, column headers, and data. Thus, the task of table semantic extraction, in at least one embodiment of the invention, can be divided into: (i) identifying the above-noted four regions, and (ii) constructing a semantic hierarchy for the row and column header regions, respectively. With respect to task (ii), row headers can often have more complicated structures than column headers. Therefore, one or more embodiments of the invention can include focusing on extracting the semantic hierarchy of row header cells. As used herein, row hierarchy and row header hierarchy are used interchangeably, as each row is characterized by its row header and the remaining data cells. Additionally, a table's semantic row header hierarchy is characterized as complex if there exist multiple cells in the same row header column that are semantically related to each other.

As also described herein, at least one embodiment of the invention can include implementing techniques that go beyond pair-wise classification for row hierarchy extraction. Existing approaches for this type of classification commonly use a tree (or forest) structure to encode the parent-child relationship between a pair of rows, and propose a classifier to predict whether the parent-child relation holds for a given pair of rows. However, the prediction of direct children of a row can lead to nonconsecutive descendants that, in practice, can often result in fragmented predictions, errors when deciding on the boundary of a section, and the need for post-processing to ensure generation of a valid hierarchy. Additionally, pair-local decisions utilize a pair-wise prediction approach that only takes into account local features of the pair itself, hindering any ability to make decisions that require global reasoning.

Accordingly, at least one embodiment of the invention includes implementing an alternative rectangle framework to consider semantic hierarchy, which includes decisions based on contiguous blocks of cells (that is, rectangles) as opposed to a single pair of cells, therefore addressing limitations of the pair-wise model. In such an embodiment, contiguous blocks of cells are assigned to a parent in one instance (that is, no fragmentation), and features that are global within a rectangle become available (that is, no pair-local decisions). Also, such an embodiment includes instantiating the rectangle framework with the REMINE algorithm for extracting row semantics that is both customizable and deterministic. Hence, an added advantage is transparency, whereby the REMINE algorithm can be adapted for a new domain even in the absence of training data, and its output can be automatically explained.

Also, to overcome the noted limitations of pair-wise classification, one or more embodiments of the invention can include expressing features defined over multiple descendant cells of a header cell, or over whole descendant table regions. In one or more such embodiments, an assumption is made regarding human-readable tables that all of the cells semantically headed (that is, explained) by a single cell form a contiguous rectangular region, defined as the support rectangle of that cell. Additionally, a rectangle can be referred to as interesting if the rectangle is the support rectangle of some cell, called a header cell of that rectangle. Accordingly, one or more embodiments of the invention include implementing a rectangle framework that represents the semantic hierarchy of a table using support rectangles and their header cells.

Such a framework maps each rectangle to a vector of features. Some features can describe characteristics of individual cells of the rectangle (for example, font, indentation, etc.), while other features can describe characteristics of the entire rectangle (for example, size, graphical lines, whitespace, whether the whole rectangle is a complete section, etc.). Such rectangle features encode richer information and alleviate the pair-local decision problem. Additionally, such features can be used to (i) identify or compare potentially interesting rectangles, and (ii) match rectangles with their potential header cells. At least one embodiment of the invention can also include utilizing rectangle features to make more informed predictions of section boundaries, greatly mitigating the fragmentation problem.

In one or more embodiments of the invention, rectangles are compared by defining a partial order on their feature values. A partial order $\preceq$ defined on the feature space $\Phi$ is called a feature partial ordering. Additionally, a framework such as detailed in one or more embodiments of the invention maps each rectangle to a vector of features $\phi(r) \in \Phi$. Intuitively, given two rectangles $r_1$, $r_2$ with feature vectors $\phi_1$, $\phi_2$, $\preceq$ is a comparator that returns one of the following: ($\phi_1 \prec \phi_2$, $\phi_1 \simeq \phi_2$, $\phi_1 \succ \phi_2$, non-comparable). In one or more embodiments of the invention, $\phi_1 \succ \phi_2$ indicates that the header row of $r_1$ tends to semantically head $r_2$ rather than the opposite. For simplicity, $r_1 \succ r_2$ can be written henceforth. In practice, there are multiple ways to define $\preccurlyeq$. For a single dimension in the feature vector, there usually exists some natural ordering. For instance, if one rectangle feature is the minimum indentation of the rectangle's row headers, the natural order is that a smaller indentation is "greater than" a larger indentation. For other features, such as font style and font color, the most frequent style/color (plain text) can be defined as "less than" other styles/colors (emphasized text). Therefore, $\preccurlyeq$ is extended from individual features to feature vectors $\phi_1$ and $\phi_2$ so that $\phi_1 \succ \phi_2$ iff $\forall i: \phi_1^{(i)} \succcurlyeq \phi_2^{(i)}$ and $\exists i: \phi_1^{(i)} \succ \phi_2^{(i)}$ where $\phi^{(i)}$ is the i-th dimension of $\phi$. $\prec$ and $\asymp$ can be similarly defined, and vectors $\phi_1$ and $\phi_2$ are non-comparable iff neither $\phi_1 \prec \phi_2$, nor $\phi_1 \succ \phi_2$, nor $\phi_1 \asymp \phi_2$.

One or more embodiments of the invention can also include looking beyond independent feature dimensions and using more complex partial ordering to encode more global features. An example complex heuristic can include the following: a rectangle headed by a section header and terminated by a section total row is unlikely to be greater than other following rectangles, because a section completed by a pairing total row is less likely to grow further.

As detailed herein, at least one embodiment of the invention includes providing and implementing a rectangle mining framework for comprehending complex tabular data, and which considers rectangular regions rather than individual cells or pairs of cells in a table. Such an embodiment includes instantiating the rectangle mining framework with an algorithm referred to herein as the REMINE algorithm, which extracts row header semantics of a table. Also, the REMINE algorithm is a bottom-up rectangle construction algorithm that is customizable. Such an algorithm can deal, for example, with a case wherein each row is treated as an atomic unit to extract row semantics. Additionally, such an algorithm can work with many forms of rectangle features. Further, because the REMINE algorithm takes an abstract partial order as input, a classifier can also be trained to define $\preccurlyeq$ if data are abundant and transparency is less important.

Figure 1:
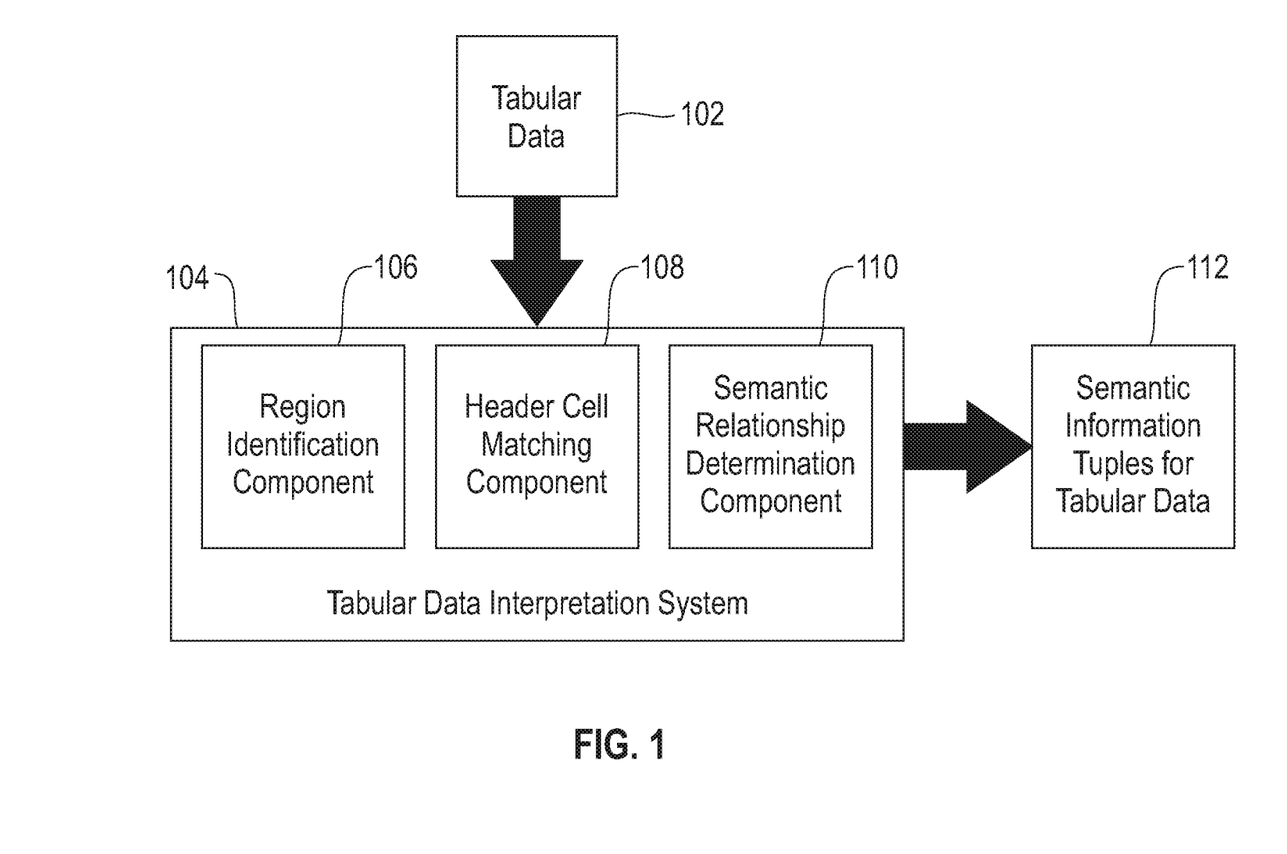
FIG. 1 is a system diagram on which at least one embodiment of the invention can be implemented.

FIG. 1 is a system diagram on which at least one embodiment of the invention can be implemented. By way of illustration, FIG. 1 depicts tabular data 102, which is processed by a tabular data interpretation system 104 to produce an output of semantic information tuples 112 for the tabular data. Specifically, the tabular data interpretation system 104 includes a region identification component 106, a header cell matching component 108, and a semantic relationship determination component 110.

The region identification component 106 identifies one or more particular regions (for example rectangular regions) within the tabular data 102, wherein each of the regions includes one or more of data cells and zero or more header cells. The header cell matching component 108 matches at least one of the identified regions to one or more header cells within the tabular data 102, wherein each of the matched header cells is semantically related to all of the data cells inside the respective matched region, and none of the data cells outside of the respective matched region. Further, the semantic relationship determination component 110 generates, based on the matching carried out by component 108, an output detailing semantic relationships between at least a subset of the data cells and at least a subset of the header cells of the tabular data 102. Further, based on such an output, the tabular data interpretation system 104 can generate and output, for each of the data cells within the tabular data 102, a tuple that includes semantic information that is contained within one or more of the header cells and pertains to that data cell.

Figure 2:
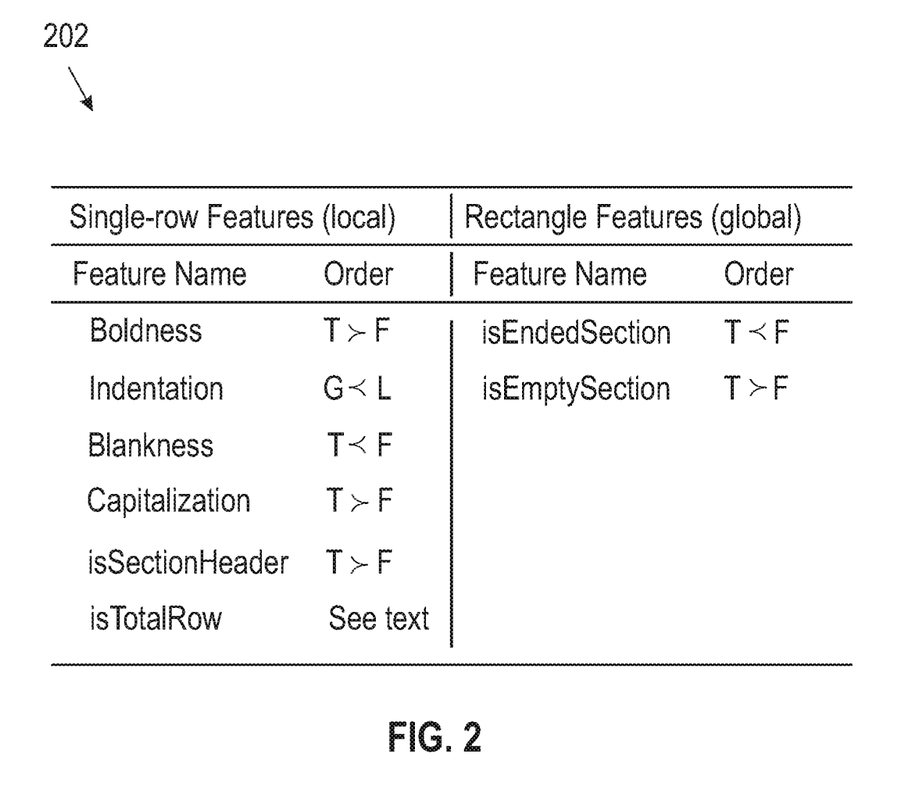
FIG. 2 is a diagram illustrating a feature set and feature partial ordering, according to an exemplary embodiment of the invention.

FIG. 2 is a diagram illustrating a feature set and feature partial ordering used in connection with the REMINE algorithm, according to an exemplary embodiment of the invention. As illustrated in table 202, the REMINE algorithm can use eight features, according to one or more embodiments of the invention. Referring to table 202, local features pertain to a single row (for example, the header row of the rectangle), and usually describe some basic format information such as boldness and indentation. As also depicted in table 202, the REMINE algorithm can use two global rectangle features: isEndedSection (that is, rectangles headed by a section header and terminated by a paired total row, defined by the row-pair feature isTotalRowPair) and isEmptySection (that is, rectangles of only one row, a section header defined by isSectionHeader). These features can be computed using one or more heuristics.

The first four (local) features indicated in table 202 are style features of the row header cell. The isSectionHeader feature is active if the row has a non-empty row header cell and empty data cells. For isTotalRow, one or more embodiments of the invention include detecting if the row header cell starts with certain keywords such as, for example, "total." For isEndedSection, to determine whether a section header and a total row are paired or not, at least one embodiment of the invention includes calculating the longest common subsequence (LCS) between the two, and adopting a threshold to decide.

Given the eight features shown in table 202, the feature partial ordering $\preccurlyeq$ can be defined as follows: For single-row features, the partial order is bold $\succ$ nonbold, smaller-indentation $\succ$ larger-indentation, not-blank $\succ$ blank, capitalized $\succ$ not-capitalized, and isSectionHeader $\succ$ not-isSectionHeader. For isTotalRow, the partial order can be defined differently, based on the heuristics that total rows are primarily used to summarize and end a section. In particular, when a total row is considered as a parent candidate, $\preccurlyeq$ will return non-comparable so that a total row cannot take children. Otherwise, when considered as a child candidate, the feature isTotalRow is ignored.

For global rectangle features, the order can be defined as follows: isEndedSection $\prec$ not-isEndedSection, and isEmptySection $\succ$ not-isEmptySection. The intuition for the rectangle features can include that i) for isEndedSection, a section ended by a pairing total row is less likely to grow further; and ii) for isEmptySection, it is rare that a section only has a header row but no other contents. Therefore, an empty section (header) is likely to take children below.

Figure 3:
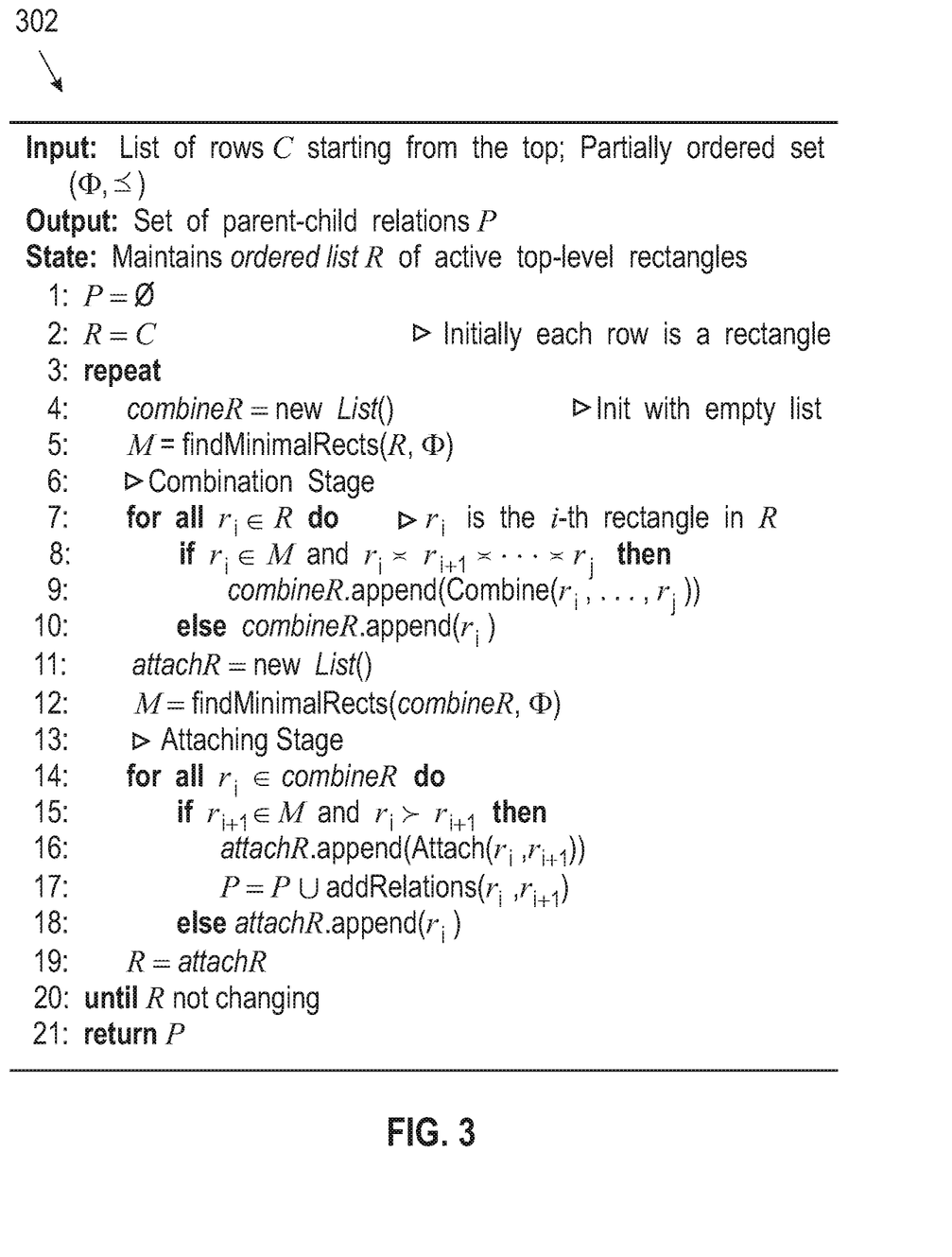
FIG. 3 is a diagram illustrating an algorithm for extracting row header semantic hierarchy, according to an exemplary embodiment of the invention.

FIG. 3 is a diagram illustrating the REMINE algorithm 302, according to an exemplary embodiment of the invention. As detailed herein, REMINE is a two-stage iterative algorithm for extracting row header semantic hierarchy. Larger rectangles are built by iteratively combining smaller rectangles until convergence. A list of active top-level rectangles $\mathcal{R}$ is maintained. Also, note that rectangle order in $\mathcal{R}$ is not dictated by $\preccurlyeq$, but rather follows a natural top-down order in the table, allowing $\mathcal{R}$ to be worked on sequentially. Each iteration can include a combination stage, wherein consecutive minimal rectangles with equal features (as defined by $\preccurlyeq$) are combined, followed by an attaching stage, where all minimal rectangles $r_i$ are attached to $r_{i-1}$ if $r_{i-1} \succ r_i$. Minimal rectangles are defined as follows: A rectangle r is minimal within a list of rectangles $\mathcal{R}$ under partial order $\preccurlyeq$, if $\forall r'$ after r in $\mathcal{R}$, it satisfies r is not $\succ r'$.

In algorithm 302, findMinimalRects($\mathcal{R} \Phi$) is used to return all minimal rectangles within $\mathcal{R}$. One or more embodiments of the invention include only working on minimal rectangles in each iteration because such rectangles are safe to be combined or attached with no potential children remaining in $\mathcal{R}$. The method Combine(.) combines consecutive rectangles with equal features, and all of the header rows of the combined rectangles become headers of the new rectangle. In addition, the method Attach($r_1$, $r_2$) attaches $r_2$ to $r_1$ as a child, and the header row of $r_1$ remains as the header of the new rectangle. When $r_2$ is attached to $r_1$, one or more embodiments of the invention can also include generating parent-child relations between the header row of $r_1$ and those of $r_2$ using addRelations. In such an embodiment, the semantic hierarchy is reconstructed by iteratively building larger rectangles.

Figure 4:
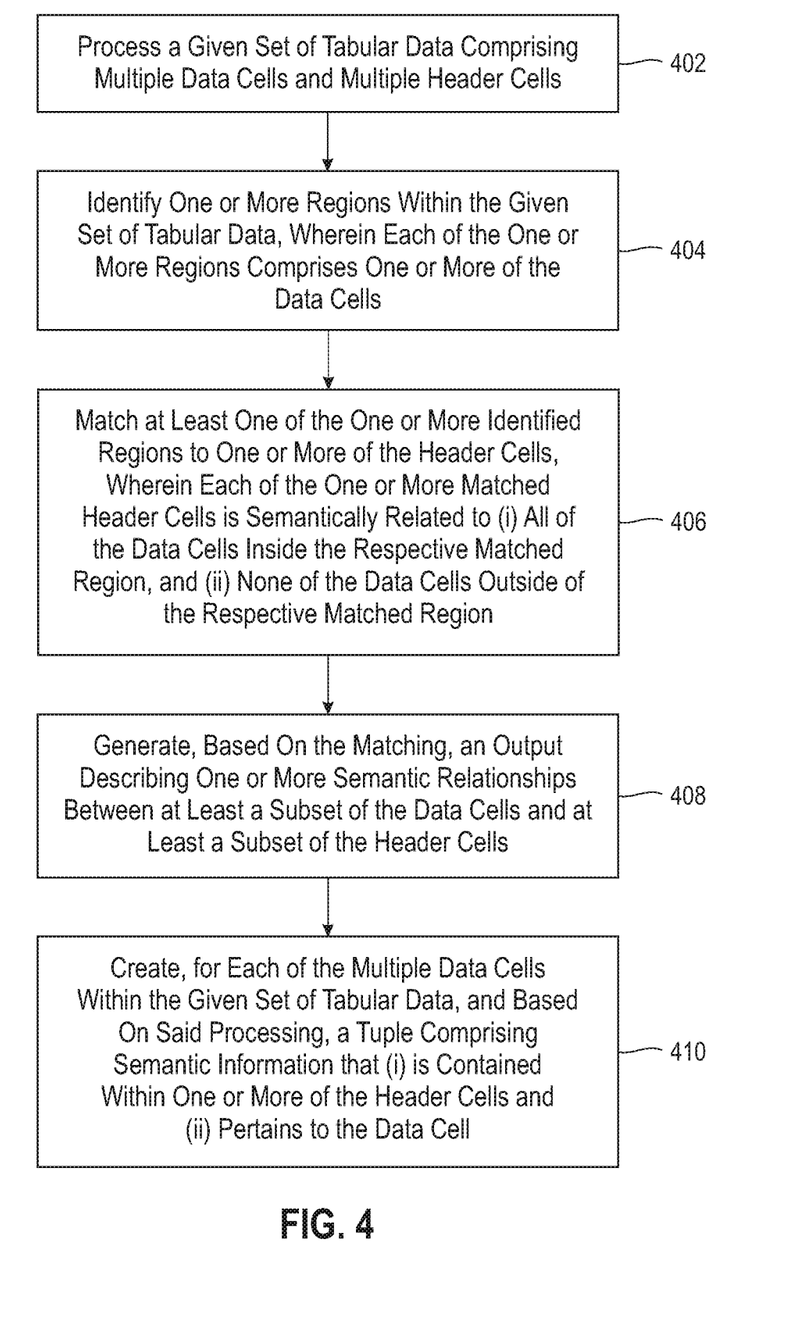
FIG. 4 is a flow diagram illustrating techniques according to an embodiment of the invention.

FIG. 4 is a flow diagram illustrating techniques according to an embodiment of the present invention. Step 402 includes processing a given set of tabular data comprising multiple data cells and multiple header cells. Processing can include determining one or more hierarchical relationships in the one or more header cells. Such a determination step can include identifying one or more characteristics of one or more entries within the given set of tabular data, and determining the one or more hierarchical relationships in the one or more header cells based on said one or more characteristics. The one or more characteristics can include, for example, font size, indentation, and/or font style. Step 402, in one or more embodiments of the invention, can also encompass Step 404, Step 406, and Step 408.

Step 404 includes identifying one or more regions within the given set of tabular data, wherein each of the one or more regions comprises one or more of the data cells. The one or more regions can include one or more rectangular regions. Additionally, in one or more embodiments of the invention, each of the one or more regions can include (i) one or more of the data cells and (ii) one or more of the header cells. Further, the one or more regions can include one or more overlapping regions and/or one or more non-overlapping regions. Step 406 includes matching at least one of the one or more identified regions to one or more of the header cells, wherein each of the one or more matched header cells is semantically related to (i) all of the data cells inside the respective matched region, and (ii) none of the data cells outside of the respective matched region.

Step 408 includes generating, based on said matching, an output describing one or more semantic relationships between at least a subset of the data cells and at least a subset of the header cells. Step 410 includes creating, for each of the multiple data cells within the given set of tabular data, and based on said processing, a tuple comprising semantic information that (i) is contained within one or more of the header cells and (ii) pertains to the data cell. Creating the tuple can be based on the one or more identified regions within the given set of tabular data.

The techniques depicted in FIG. 4 can also include mapping each of the one or more regions to a vector of one or more features, wherein the one or more features describe one or more characteristics of the one or more regions. Such characteristics of the one or more regions can include, for example, size, graphical lines, and/or whitespace. Additionally, in one or more embodiments of the invention, identifying a semantic relationship between regions and header cells can be based on a partial ordering of the one or more regions defined in view of the vector to which each of the one or more regions is mapped. Further, identifying the one or more regions within the given set of tabular data can include specifying one or more semantically related regions within the given set of tabular data based on evaluating the identified features.

Also, an additional embodiment of the invention can include processing a given set of tabular data comprising one or more data cells and one or more header cells, mapping each of one or more rectangular regions within the given set of tabular data to a vector of one or more features, and generating a partial ordering of the one or more rectangular regions based on the vector to which each of the one or more rectangular regions is mapped. Such an embodiment can also include identifying, based on the generated partial ordering, at least one of the one or more rectangular regions, wherein each of the at least one identified rectangular regions comprises at least one of the one or more data cells that are semantically related to at least one of the one or more header cells. Further, such an embodiment can include creating, for each of the one or more data cells, and based on the at least one identified rectangular region, a tuple comprising semantic information that (i) is contained within the one or more header cells and (ii) pertains to the data cell, and outputting the created tuples to at least one user. Also, in such an embodiment, identifying the at least one of the one or more rectangular regions can include using the generated partial ordering to identify one or more of the rectangular regions associated with one or more semantic relationships exceeding a given threshold value.

Further, another additional embodiment of the invention can include identifying multiple semantically-related rectangular regions in a table, the table having header cells and data cells therein, wherein one or more of the identified semantically-related rectangular regions overlap each other within the table, and wherein each of the identified semantically-related rectangular regions include all of the data cells semantically-related to at least one of the header cells. Such an embodiment can also include, for each of the data cells within the identified semantically-related rectangular regions, creating a tuple that includes semantic information (i) pertaining to the data cell and (ii) that appears in the table, and outputting the created tuples to at least one user.

The techniques depicted in FIG. 4 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 4 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 5:
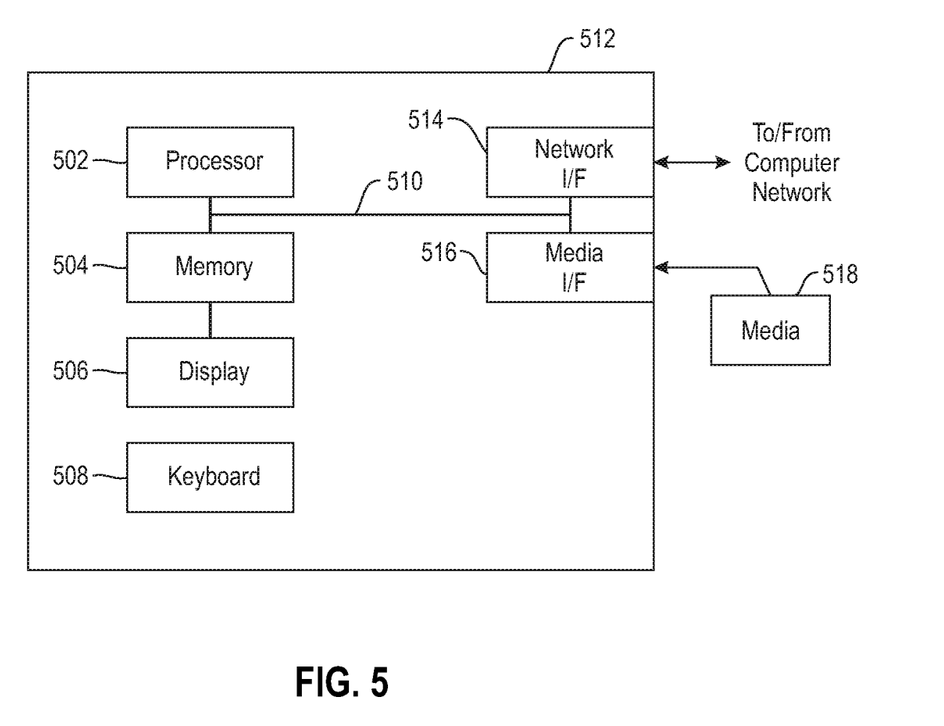
FIG. 5 is a system diagram of an exemplary computer system on which at least one embodiment of the invention can be implemented.

Additionally, an embodiment of the present invention can make use of software running on a computer or workstation. With reference to FIG. 5, such an implementation might employ, for example, a processor 502, a memory 504, and an input/output interface formed, for example, by a display 506 and a keyboard 508. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 502, memory 504, and input/output interface such as display 506 and keyboard 508 can be interconnected, for example, via bus 510 as part of a data processing unit 512. Suitable interconnections, for example via bus 510, can also be provided to a network interface 514, such as a network card, which can be provided to interface with a computer network, and to a media interface 516, such as a diskette or CD-ROM drive, which can be provided to interface with media 518.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 502 coupled directly or indirectly to memory elements 504 through a system bus 510. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 508, displays 506, pointing devices, and the like) can be coupled to the system either directly (such as via bus 510) or through intervening I/O controllers (omitted for clarity).

Network adapters such as network interface 514 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 512 as shown in FIG. 5) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 502. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that implementation of the teachings recited herein are not limited to a particular computing environment. Rather, embodiments of the present invention are capable of being implemented in conjunction with any type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
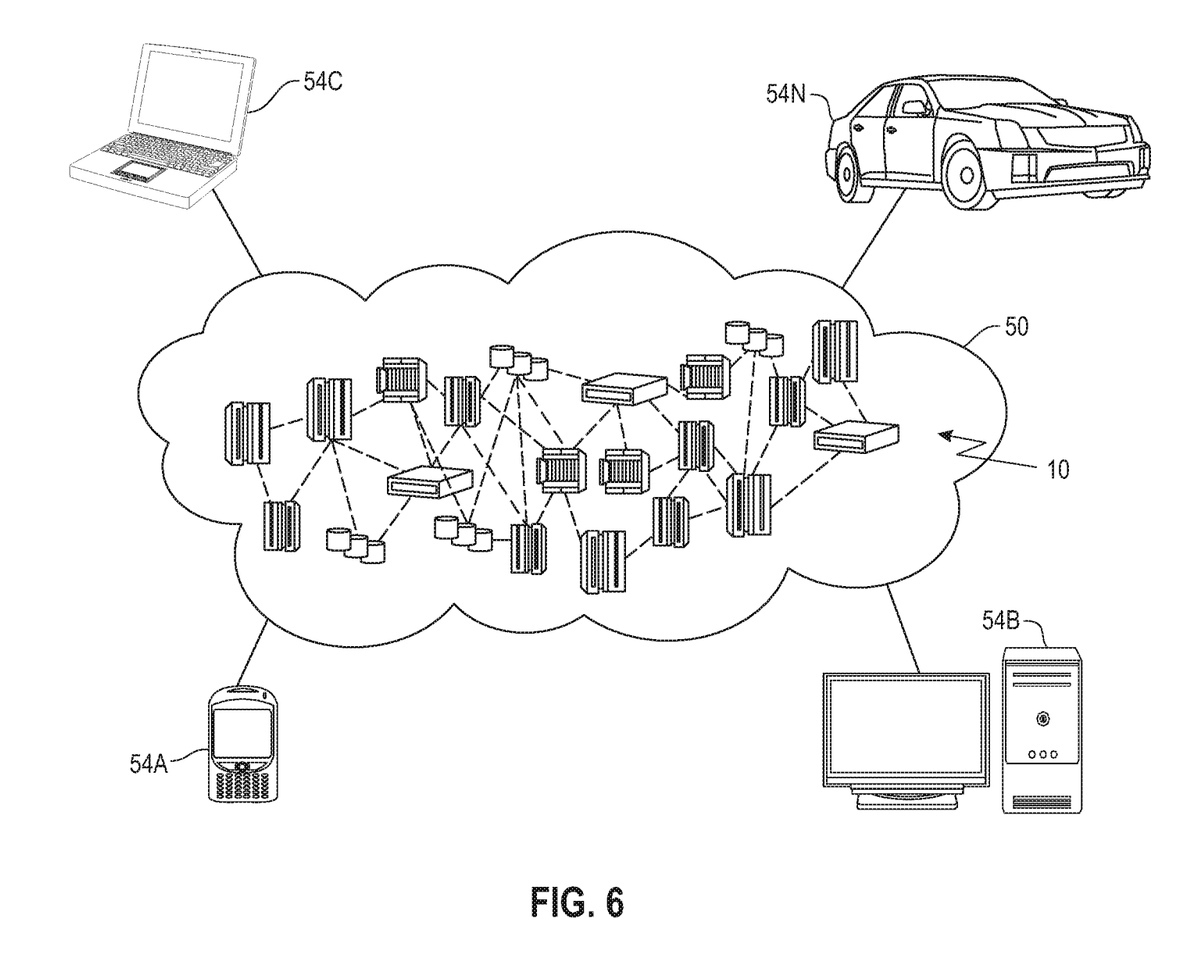
FIG. 6 depicts a cloud computing environment according to an embodiment of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
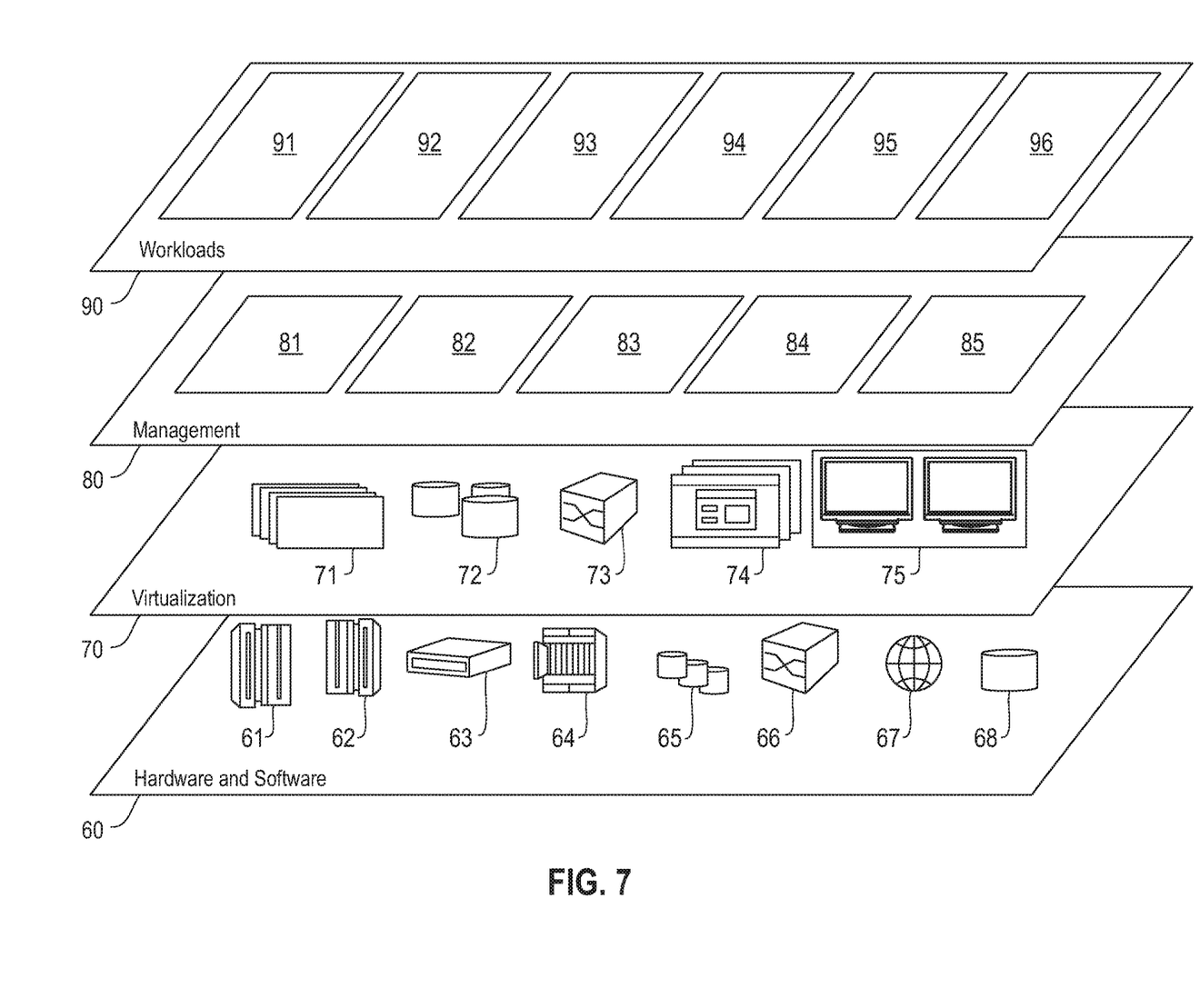
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and tabular data structure and semantics extraction 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, identifying characteristics of at least some entries in a table, and using the identified characteristics to extract the hierarchy from the table.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising steps of:
    processing a given set of tabular data comprising multiple data cells and multiple header cells, wherein said processing comprises:
        identifying one or more regions within the given set of tabular data, wherein each of the one or more regions comprises one or more of the data cells;
        matching at least one of the one or more identified regions to one or more of the header cells, wherein each of the one or more matched header cells is semantically related to (i) all of the data cells inside the respective matched region, and (ii) none of the data cells outside of the respective matched region; and
        generating, based on said matching, an output describing one or more semantic relationships between at least a subset of the data cells and at least a subset of the header cells; and
    creating, for each of the multiple data cells within the given set of tabular data, and based on said processing, a tuple comprising semantic information that (i) is contained within one or more of the header cells and (ii) pertains to the data cell;
    wherein the steps are carried out by at least one computing device.

2. The computer-implemented method of claim 1, wherein the one or more regions comprise one or more rectangular regions.

3. The computer-implemented method of claim 1, wherein each of the one or more regions comprises (i) one or more of the data cells and (ii) one or more of the header cells.

4. The computer-implemented method of claim 1, wherein said creating a tuple is based on the one or more identified regions within the given set of tabular data.

5. The computer-implemented method of claim 1, wherein said processing comprises determining one or more hierarchical relationships in the one or more header cells, and wherein said determining comprises identifying one or more characteristics of one or more entries within the given set of tabular data, and determining the one or more hierarchical relationships in the one or more header cells based on said one or more characteristics.

6. The computer-implemented method of claim 5, wherein the one or more characteristics comprises at least one of font size, indentation, and font style.

7. The computer-implemented method of claim 1, wherein said creating comprises evaluating one or more identified features across the given set of tabular data.

8. The computer-implemented method of claim 7, wherein said identifying the one or more regions within the given set of tabular data comprises specifying one or more semantically related regions within the given set of tabular data based on said evaluating.

9. The computer-implemented method of claim 1, wherein the one or more regions comprises at least one of one or more overlapping regions and one or more non-overlapping regions.

10. The computer-implemented method of claim 1, comprising:
    mapping each of the one or more regions to a vector of one or more features.

11. The computer-implemented method of claim 10, wherein the one or more features describe one or more characteristics of the one or more regions.

12. The computer-implemented method of claim 11, wherein the one or more characteristics of the one or more regions comprises at least one of size, graphical lines, and whitespace.

13. The computer-implemented method of claim 10, comprising:
    identifying one or more semantic relationships between the one or more regions and the multiple header cells based on a partial ordering of the one or more regions defined in view of the vector to which each of the one or more regions is mapped.

14. A computer program product comprising a computer readable storage medium having program instructions embodied therewith, the program instructions executable by a computing device to cause the computing device to:
    process a given set of tabular data comprising multiple data cells and multiple header cells, wherein said processing comprises:
        identify one or more regions within the given set of tabular data, wherein each of the one or more regions comprises one or more of the data cells;
        match at least one of the one or more identified regions to one or more of the header cells, wherein each of the one or more matched header cells is semantically related to (i) all of the data cells inside the respective matched region, and (ii) none of the data cells outside of the respective matched region; and
        generate, based on said matching, an output describing one or more semantic relationships between at least a subset of the data cells and at least a subset of the header cells; and
    create, for each of the multiple data cells within the given set of tabular data, and based on said processing, a tuple comprising semantic information that (i) is contained within one or more of the header cells and (ii) pertains to the data cell.

15. The computer program product of claim 14, wherein the program instructions further cause the computing device to:
    map each of the one or more regions to a vector of one or more features; and
    identify one or more semantic relationships between the one or more regions and the multiple header cells based on a partial ordering of the one or more regions defined in view of the vector to which each of the one or more regions is mapped.

16. A system comprising:

a memory; and at least one processor operably coupled to the memory and configured for:

processing a given set of tabular data comprising multiple data cells and multiple header cells, wherein said processing comprises:

identifying one or more regions within the given set of tabular data, wherein each of the one or more regions comprises one or more of the data cells;

matching at least one of the one or more identified regions to one or more of the header cells, wherein each of the one or more matched header cells is semantically related to (i) all of the data cells inside the respective matched region, and (ii) none of the data cells outside of the respective matched region; and generating, based on said matching, an output describing one or more semantic relationships between at least a subset of the data cells and at least a subset of the header cells; and creating, for each of the multiple data cells within the given set of tabular data, and based on said processing, a tuple comprising semantic information that (i) is contained within one or more of the header cells and (ii) pertains to the data cell.

17. The system of claim 16, wherein said creating a tuple is based on the one or more identified regions within the given set of tabular data.

18. A computer-implemented method, the method comprising steps of:

processing a given set of tabular data comprising one or more data cells and one or more header cells;

mapping each of one or more rectangular regions within the given set of tabular data to a vector of one or more features;

generating a partial ordering of the one or more rectangular regions based on the vector to which each of the one or more rectangular regions is mapped;

identifying, based on the generated partial ordering, at least one of the one or more rectangular regions, wherein each of the at least one identified rectangular regions comprises at least one of the one or more data cells that are semantically related to at least one of the one or more header cells;

creating, for each of the one or more data cells, and based on the at least one identified rectangular region, a tuple comprising semantic information that (i) is contained within the one or more header cells and (ii) pertains to the data cell; and outputting the created tuples to at least one user;

wherein the steps are carried out by at least one computing device.

19. The computer-implemented method of claim 18, wherein said identifying comprises using the generated partial ordering to identify one or more of the rectangular regions associated with one or more semantic relationships exceeding a given threshold value.

* * * * *